UNITED STATES PATENT OFFICE.

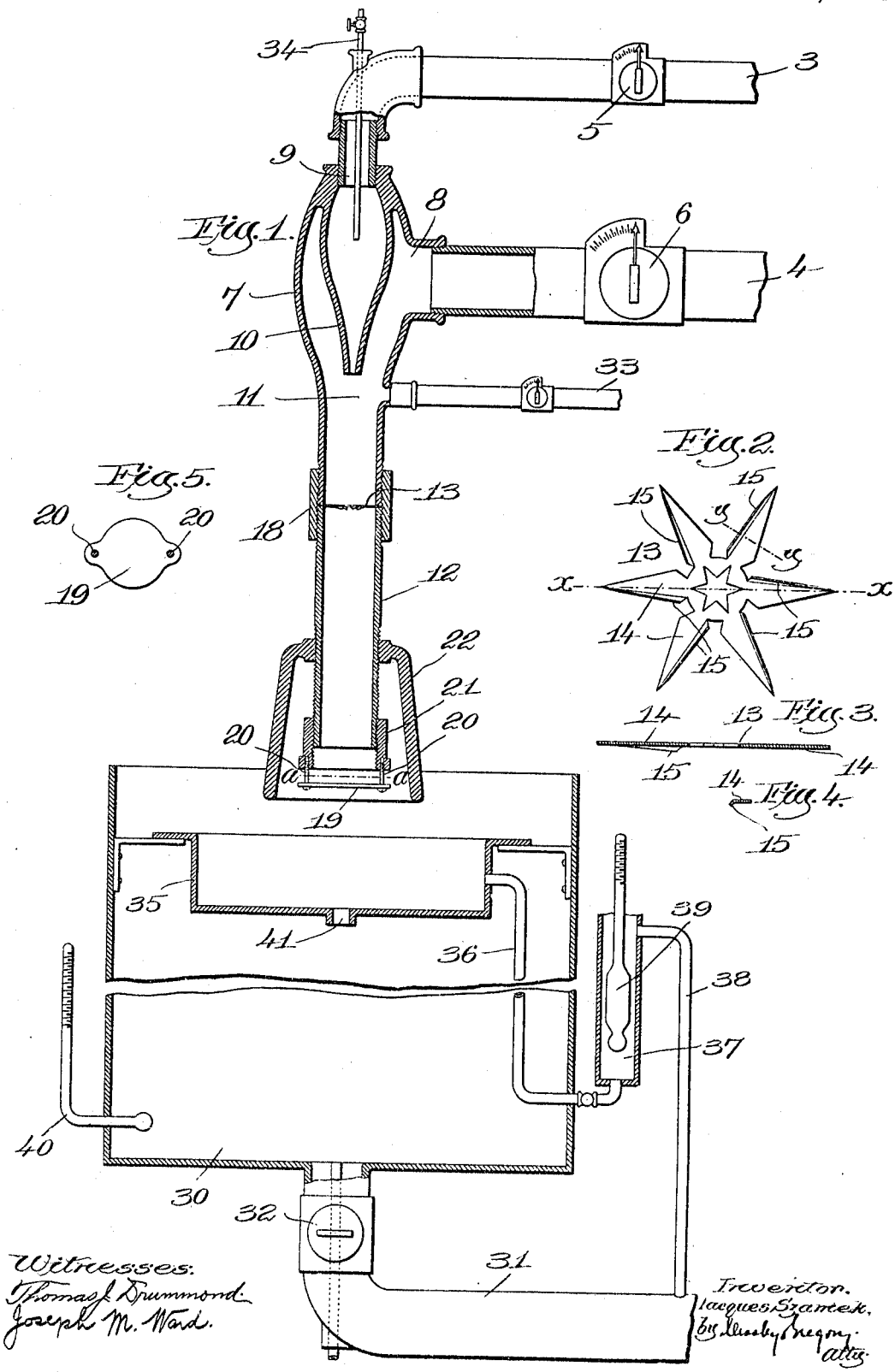

IACQUES SZAMEK, OF CAMBRIDGE, MASSACHUSETTS.

APPARATUS FOR MIXING LIQUIDS.

945,143.  Specification of Letters Patent.   Patented Jan. 4, 1910.

Application filed July 28, 1909. Serial No. 510,083.

*To all whom it may concern:*

Be it known that I, IACQUES SZAMEK, a subject of the King of Hungary, residing at Cambridge, county of Middlesex and State of Massachusetts, have invented an Improvement in Apparatus for Mixing Liquids, of which the following description, in connection with the accompanying drawing, is a specification, like characters on the drawing representing like parts.

This invention relates to an apparatus for mixing liquids having different characteristics, and it has been especially designed for mixing water and molasses for the purpose of forming "mash" such as is used in the production of alcohol, although the invention can be used for mixing together other liquids which do not readily assimilate. As is known to those skilled in the art this mash is made by mixing water and molasses in the proper proportions and then adding yeast so as to cause the whole to ferment thereby to change the sugar in the molasses into alcohol. The fermented mixture is subsequently distilled so as to separate the alcohol from the other ingredients.

The operation of making the mash as now commonly carried out is to deliver into a mixing tub the water and molasses separately and then to cause the contents of the tub to be agitated by means of mechanical stirrers, or by the introduction of air into the body of liquid, or by some other suitable means in order to intimately mix the molasses and water. After the molasses and water have been sufficiently mixed in the mixing tub, the mixture is pumped over into a fermenting tub where the yeast is added and the fermentation takes place. Molasses and water are rather difficult to mix intimately together so as to form a homogeneous mixture, and the operation of thoroughly mixing a large mixing tub full of molasses and water not only involves considerable labor, but consumes quite a period of time. Where this method of mixing molasses and water is carried out it has been found necessary to maintain on hand a sufficient quantity of the mixture to fill a fermenting tank, so that the process of fermentation need not be interrupted for the purpose of mixing a fresh quantity of liquid. One disadvantage of keeping a quantity of the mixed molasses and water on hand is that under some circumstances the mixture will ferment even without the addition of yeast, and its value for forming the foundation of a mash is thereby decreased.

One of the objects of my invention is to provide a novel apparatus which is adapted to thoroughly and intimately mix molasses and water, or any other two dissimilar liquids, while they are being delivered from a pipe.

The advantage of my apparatus in the distilling trade is that the water and molasses for forming the mash may be properly mixed while they are being delivered to the fermenting tub, and the operation of delivering them to the mixing tub and mixing them therein and also the necessity of maintaining on hand a comparatively large quantity of the mixture is done away with.

My improved apparatus is provided with two inlets for the two liquids to be mixed, and it has such a construction that while the liquids are passing therethrough, they become thoroughly and intimately mixed, and the mixture discharged from the apparatus is a homogeneous one.

I will first describe one embodiment of my invention and then point out the novel features thereof in the appended claims.

Referring to the drawings, Figure 1 is a part elevation and part sectional view of a mixing apparatus embodying my invention; Fig. 2 is an enlarged plan view of the preliminary mixer; Fig. 3 is a section on the line $x$—$x$, Fig. 2; Fig. 4 is a section on the line $y$—$y$, Fig. 2; Fig. 5 is a section on the line $a$—$a$, Fig. 1.

The two liquids to be mixed are delivered to the apparatus through two separate pipes 3 and 4 respectively, each of which has a valve therein for controlling the flow of liquid therethrough, said valves being designated 5 and 6, respectively.

In the present embodiment of the invention the portion of the apparatus to which the two separate liquids are delivered is somewhat similar to a suction T, it being so arranged that the water is delivered through the nozzle of the T and the molasses or other heavier liquid is delivered into the body thereof around the nozzle. This suction T portion of the apparatus is shown at 7 and has the inlet 8 with which the pipe 4 communicates and the inlet 9 with which the pipe 3 communicates.

The suction T is provided with the interior nozzle 10 situated within the body and communicating with the inlet 9 so that the liquid which is delivered to the mixing apparatus through the pipe 3 will be delivered from said nozzle. The body of the suction T is contracted at 11 at a point below the inlet port 8 and the egress end of the nozzle 10 preferably extends down to the contracted portion of the body. Secured to the lower end of the suction T and forming an extension thereof is a mixing pipe 12 in which the liquids are partially mixed. Situated within this mixing pipe or beyond the delivery end of the nozzle 10 is a preliminary mixer 13 shown best in Figs. 2, 3 and 4, which is adapted to partially mix the liquids and is preferably arranged so as to give the partially-mixed liquids a whirling motion as they pass on through the mixing pipe 12. In the preferred embodiment of my invention this preliminary mixer has a star shape and is provided with the radial arms 14 each of which has at one edge the inclined flange or fin 15. The shape of the arms 14 and of the fins 15 is such that when the current of liquid strikes the preliminary mixer it is more or less broken up thereby and is also given a swirling motion due to the inclined position of the fins 15. This preliminary mixer may be secured in place in any suitable way and as one convenient way I have shown it as clamped between the end of the suction T portion and the mixing pipe 12, said two sections being connected by an ordinary coupling 18.

Situated beneath the mixing pipe 12 is a plate 19 against which the stream issuing from the mixing pipe impinges and which serves to convert said stream into an annular sheet of liquid which is thrown out horizontally. This plate 19 may be sustained in any suitable way, and I have herein shown it as provided with two pins or arms 20 which are secured to and depend from a collar 21 that is screw-threaded to the end of the mixing pipe 12. The advantage of this construction is that said plate 19 can be raised or lowered to vary the distance thereof from the end of the mixing pipe.

Situated around the lower end of the pipe is an annular wall so placed that the horizontal annular sheet of liquid is thrown thereagainst. This annular wall may be provided for in a variety of ways, but I have herein shown it as formed by the interior surface of a bell-shaped member 22 which is preferably screw-threaded to the mixing pipe so that it can be adjusted vertically thereon.

In the operation of the mixing apparatus as thus far described the water or more fluid liquid will be delivered into the mixing pipe through the nozzle 10 and the force of the stream issuing from the nozzle will form more or less suction in the suction chamber surrounding the nozzle, which suction will help to draw in the molasses or thicker less fluid liquid, the operation at this point being similar to that of the ordinary suction T. The two liquids will be more or less mixed together at this point. The stream issuing from the suction T impinges against the preliminary mixer 13 and becomes considerably broken up thereby and as it passes said mixer the fins 15 serve to give it a whirling motion. As the stream issues from the mixing pipe 13, it strikes the plate 19 and is thrown out horizontally in a sheet which strikes against the interior face of the member 22. The dashing of the stream of liquid against the plate 19 and then outwardly against the bell-shaped member 22 serves to completely and intimately mix the liquids so that the product which is delivered from the bell-shaped member 22 is a homogeneous mixture.

The mixing apparatus above described may be sustained so as to deliver the mixture at any convenient place. I have herein shown it as arranged to deliver the mixture into a tank 30 from the bottom of which extends a pipe 31 leading to the storage or fermenting tank, said pipe preferably being controlled by a suitable valve 32.

In mixing molasses and water in order to provide a mash for the purpose of making alcohol, it is essential that the final mixture should have a predetermined temperature and be of a certain specific gravity. In order to secure the correct temperature I provide for admitting warm water or steam or both to the mixing apparatus.

In Fig. 1 I have shown at 33 a pipe leading to the suction T and adapted to deliver hot water thereto, and at 34 I have shown a steam pipe leading into the suction T through which steam may be admitted. If the temperature of the mixture is too cool it may be raised either by admitting hot water through the pipe 33, in which case the amount of cold water admitted through the pipe 3 will be correspondingly diminished, or by admitting steam through the steam pipe 31. In order to keep track of the specific gravity of the mixture I have provided an auxiliary tank so arranged that there will be a constant flow of the mixture therethrough, and I determine the specific gravity by placing a hydrometer in this auxiliary tank which is preferably an open-topped one. Since there is a constant current of the mixture passing through the auxiliary tank, it will follow that the specific gravity and temperature of the liquid in said tank will correspond to that of the mixture delivered from the apparatus, and if there are any changes in the temperature and specific gravity of the mixture as delivered from the apparatus, the same changes will be found in the liquid in the auxiliary tank. Situated within the main tank is an open-topped basin 35 into which the mixture is delivered from the mixing apparatus. The greater portion of the liquid delivered from the mixing apparatus flows over the top of this basin into the tank 30. Communicating with this basin is a by-pass pipe 36 leading to the bottom of an auxiliary tank 37 which is preferably placed outside of the tank 30 and another pipe 38 leads from the top of the auxiliary tank into the discharge pipe 31. When the apparatus is in operation the basin 35 will be filled with liquid and there will be a constant stream of the liquid passing through the by-pass 36 and auxiliary tank 37 to the discharge pipe 31. By keeping a hydrometer 39 and a thermometer if desired in the open-topped auxiliary tank 31, the temperature and specific gravity of the mixture can be observed at all times. If desired a thermometer 40 may be sustained by the tank 30 to measure the temperature of the liquid therein, but perhaps the preferable way would be to measure temperature by a thermometer in the auxiliary tank 37. The basin 35 is preferably provided with an aperture 41 in its bottom through which the liquid remaining in the basin may drain out after the flow of liquids through the apparatus has been stopped.

The steam pipe 34 can not only be used for heating the mixture as above suggested, but is also of importance in that by admitting steam therethrough the entire apparatus can be sterilized whenever it is not in use.

I have found from practice that a device of this character will thoroughly mix molasses and water to form a perfectly homogeneous mixture suitable for forming mash. The use of the device avoids the necessity of mixing the molasses and water in a separate mixing tub and also avoids the necessity of having on hand a greater or less quantity of mixed molasses and water which is liable to ferment before it is delivered to the fermenting tank.

While I have designed my apparatus for use in mixing molasses and water, yet I wish it understood that it can equally well be used for mixing other liquids which do not readily mix, and I do not wish to be limited as to the use to which it may be put.

Having fully described my invention, what I claim as new and desire to secure by Letters Patent is:—

1. In an apparatus for mixing liquids, the combination with a mixing pipe open at its discharge end, of means to deliver the liquids to be mixed thereto, means to partially mix the liquids as they pass into and through the mixing pipe, a plate situated at the discharge end of the pipe and against which the stream issuing from the pipe impinges whereby said stream is converted into a laterally-directed sheet, and an abutment wall surrounding the plate and against which the sheet is thrown.

2. In an apparatus for mixing liquids, the combination with a mixing pipe open at its discharge end, of means to introduce the liquids to be mixed thereto, means to give the liquids a whirling motion as they pass through the pipe thereby to partially mix them, a plate at the discharge end of the pipe situated to intercept the stream issuing from the pipe thereby to convert said stream into a sheet, and a bell-shaped member adjustably sustained by the mixing pipe and inclosing said plate.

3. In an apparatus for mixing liquids, the combination with a suction T having two inlets for the liquids to be mixed, of a mixing pipe secured to the outlet of the T, a preliminary mixer in said pipe, and means at the discharge end of the pipe to further the mixing operation.

4. In an apparatus for mixing liquids, the combination with a suction T having inlets for the different liquids to be mixed, a mixing pipe communicating with the discharge outlet of said suction T, a star-shaped preliminary mixer within the pipe leading from the suction T, and means at the discharge end of said pipe to further mix the liquids.

5. In an apparatus for mixing liquids, the combination with a suction T having inlets for the different liquids to be mixed, a mixing pipe communicating with the discharge outlet of said suction T, a star-shaped preliminary mixer within the pipe leading from the suction T, each arm of said preliminary having an inclined discharge surface, and means at the discharge end of said pipe to further mix the liquids.

6. In an apparatus for mixing liquids, the combination with a mixing pipe open at its end, means to deliver liquids to be mixed thereto, means at the discharge end of the pipe against which the stream issuing therefrom impinges to convert said stream into a sheet, and an abutment wall against which the sheet is thrown.

7. In an apparatus for mixing liquids, the combination with a mixing pipe open at its end, of means to introduce the liquids to be mixed thereto, a plate sustained at the end of said pipe and against which the stream of liquids issuing thereform impinges whereby said stream is converted into a laterally-directed sheet, and an annular member surrounding said plate and against which the sheet is thrown.

8. In an apparatus for mixing liquids, the combination with a suction T having means for introducing the liquids to be mixed thereto, of a mixing pipe associated with said suction T, means to preliminarily mix the liquids as they pass into and through the mixing pipe, a plate sustained at the end of the mixing pipe against which the stream of liquids issuing therefrom impinges, and a bell-shaped member adjustably sustained by said mixing pipe and inclosing said plate.

9. In an apparatus for mixing liquids, the combination with a suction T having an inlet pipe to deliver liquid to the nozzle and another pipe to deliver another liquid to the space exterior to the nozzle, of a mixing pipe connected to the discharge end of the suction T, a preliminary mixer at the inlet end of said mixing pipe, a plate adjustably sustained at the end of the mixing pipe against which the stream of liquid issuing therefrom impinges, and a bell-shaped member inclosing said plate and adjustable relative thereto.

10. In an apparatus for mixing liquids, the combination with a mixing pipe, of means to deliver the liquids to be mixed thereto, a stationary star-shaped preliminary mixer within and adjacent the mouth of the mixing pipe, the arms of said mixer each having an inclined discharge surface, and means at the discharge end of said mixing pipe to complete the mixing of the liquids.

In testimony whereof, I have signed my name to this specification, in the presence of two subscribing witnesses.

IACQUES SZAMEK.

Witnesses:
   Louis C. Smith,
   Thomas J. Drummond.

Correction in Letters Patent No. 945,143.

It is hereby certified that in Letters Patent No. 945,143, granted January 4, 1910, upon the application of Iacques Szamek, of Cambridge, Massachusetts, for an improvement in "Apparatus for Mixing Liquids," an error appears in the printed specification requiring correction, as follows: Page 3, line 102, before the word "having" the word *mixer* should be inserted; and that the said Letters Patent should be read with this correction therein that the same may conform to the record of the case in the Patent Office.

Signed and sealed this 25th day of January, A. D., 1910.

[SEAL.]

C. C. BILLINGS,

*Acting Commissioner of Patents.*